(12) United States Patent
Schreier

(10) Patent No.: US 6,275,480 B1
(45) Date of Patent: Aug. 14, 2001

(54) FAST ASSOCIATED CONTROL CHANNEL CODING FOR SPEECH CHANNEL

(75) Inventor: Nicholas Carl Schreier, Bensalem, PA (US)

(73) Assignee: Lockheed Martin Corp., King of Prussia, PA (US)

( * ) Notice: Subject to any disclaimer, the term of this patent is extended or adjusted under 35 U.S.C. 154(b) by 0 days.

(21) Appl. No.: 08/996,463

(22) Filed: Dec. 22, 1997

Related U.S. Application Data
(60) Provisional application No. 60/058,671, filed on Sep. 12, 1997.

(51) Int. Cl.[7] ................................................ H04B 7/212
(52) U.S. Cl. .............................................................. 370/321
(58) Field of Search .......................... 455/13.1; 370/316, 370/321–325, 347; 714/786, 787, 795

(56) References Cited

U.S. PATENT DOCUMENTS

| | | | |
|---|---|---|---|
| 5,717,686 | * | 2/1998 | Schiavoni ............................. 370/321 |
| 5,949,766 | * | 9/1999 | Ibanez-Meier et al. ............. 370/316 |
| 5,991,635 | * | 11/1999 | Dent et al. ............................ 455/517 |

* cited by examiner

Primary Examiner—Chau Nguyen
Assistant Examiner—Jasper Kwoh
(74) Attorney, Agent, or Firm—W. H. Meise

(57) ABSTRACT

A satellite cellular communication system includes terrestrial user terminals and gateways, which are interconnected, at least in part, by communications over antenna spot beams produced by the satellite. Various control signals and information signals traverse the system. The processing is simplified at the terrestrial terminals by adding dummy bits to the call maintenance signals, and processing them to equal the frame size of the traffic signals, and by encoding the call maintenance signals using the same algorithm as that used to encode the traffic signals. The call traffic signals are separated from the call maintenance signals, after decoding the frames in a common manner, by (a) identifying as traffic signals those frames in which error detection and correction (EDAC) identifies no error, and in which the 27 bits added to the call maintenance signals do not match the added-bit pattern. The call maintenance signals are reassembled into 224-bit frames, and identified by EDAC applied to the reassembled frames.

7 Claims, 6 Drawing Sheets

FAST ASSOCIATED CONTROL CHANNEL CODING FOR SPEECH CHANNEL

This patent application claims priority of provisional patent application Ser. No. 60/058,671 filed Sep. 12, 1997.

FIELD OF THE INVENTION

This invention relates to satellite communication systems, and more particularly to satellite cellular communication systems.

BACKGROUND OF THE INVENTION

Mobile cellular communication systems have become of increasing importance, providing mobile users the security of being able to seek aid in case of trouble, allowing dispatching of delivery and other vehicles with little wasted time, and the like. Present cellular communication systems use terrestrial transmitters, such as fixed sites or towers, to define each cell of the system, so that the extent of a particular cellular communication system is limited by the region over which the towers are distributed. Many parts of the world are relatively inaccessible, or, as in the case of the ocean, do not lend themselves to location of a plurality of dispersed cellular sites. In these regions of the world, spacecraft- or satellite-based communication systems may be preferable to terrestrial-based systems. It is desirable that a spacecraft cellular communications system adhere, insofar as possible, to the standards which are common to terrestrial systems, and in particular to such systems as the GLOBAL SYSTEM FOR MOBILE COMMUNICATIONS system (GSM), which is in use in Europe.

The GSM system is a cellular communications system which communicates with user terminals by means of electromagnetic transmissions from, and receptions of such electromagnetic signals at, fixed sites or towers spaced across the countryside. The GSM system is described in detail in the text *The GSM System for Mobile Communications*, subtitled *A Comprehensive Overview of the European Digital Cellular System*, authored by Michel Mouly and Marie-Bernadette Pautet, and published in 1992 by the authors, at 4, rue Eliseée Reclus, F-91120 Palaiseau, France. Each fixed site or tower (tower) of the GSM system includes transmitter and receiver arrangements, and communicates with user terminals by way of signals having a bandwidth of 50 MHz., centered at about 900 Mhz., and also by way of signals having a bandwidth of 150 Mhz. Centered at about 1800 Mhz.

In cellular communications systems such as GSM, associated and dedicated control signaling is required for sending information messages about the system between the terrestrial mobile user terminal and the base station. Such information messages serve two purposes: (1) call "Set-Up", for which standalone dedicated control channels, such as the SDCCH channel in the GSM system, are used during the setup of the call, and (2) Call Maintenance, for which slow and fast associated channels, such as SACCH and FACCH in the GSM system, are used to provide signaling during the call. Mobile Satellite Systems based upon the GSM architecture use similar dedicated and associated control channels to send system information messages as part of call set-up and "in-call signaling."

"In-Call Signaling" in a satellite system, must occur during a call, or while a call is currently in place, much as in FACCH. The "in-call" signalling is accomplished by "stealing" or commandeering portions of TDMA traffic slots from the ongoing call. The TDMA burst structure for GSM uses two bits designated with information-carrying capacity to indicate when traffic data is being overridden by in-call signaling. The use of these two bits as an in-call-signalling flag reduces the available traffic throughput, and reduces the available error-correction capability for traffic.

Allowed patent application serial U.S. Pat. No. 5,717,686 filed Jan. 21, 1997 in the SPACECRAFT TDMA COMMUNICATIONS SYSTEM WITH CALL INTERRUPT CODING SYSTEM FOR MAXIMIZING THROUGHPUT, describes a communication system illustrated in FIG. 1, which is a simplified block diagram of a spacecraft or satellite cellular communications system 10. In system 10, a spacecraft 12 includes a transmitter (TX) 12$t$, a receiver (RX) 12$r$, and a frequency-dependent channelizer 12$c$, which routes bands of frequencies from the receiver 12$r$ to the transmitter 12$t$. Spacecraft 12 also includes an array of frequency converters 12$cv$, which convert the uplink frequency to an appropriate downlink frequency. Antenna 12$a$ generates a plurality 20 of spot beams, one spot beam for each frequency band. Some of the spot beams are illustrated as 20$a$, 20$b$, 20$c$, and 20$d$. Each spot beam 20$x$ (where x represents any suffix) defines a footprint on the earth 1 below. Two of the spot beam footprints are illustrated as 20$bf$ and 20$cf$. It will be understood that those spot beams which are illustrated in "lightning bolt" form also produce footprints. As is known to those skilled in the art, the footprints of spot beams from a spacecraft may overlap, to provide continuous coverage of the terrestrial region covered by the spot beams.

As illustrated in FIG. 1, a group 16 of mobile terrestrial user terminals or stations includes two mobile user terminals, denominated 16$a$ and 16$b$, each of which is illustrated as having an upstanding whip antenna (not separately designated). User terminal 16$a$ lies within the footprint 20$bf$, and user terminal 16$b$ lies within footprint 20$cf$. User terminals 16$a$ and 16$b$ provide communications service to users, as described below. Each user terminal 16$a$ and 16$b$ is illustrated as including an access signal generator 16$aa$ and 16$ab$, respectively. FIG. 1 also illustrates a terrestrial gateway terminal (fixed site, tower, or station) 24, which lies in a footprint (not designated) of spot beam 20$a$. Gateway terminal 14 communicates with spacecraft 12 by way of electromagnetic signals transmitted from an antenna 14$a$, and receives signals from the spacecraft by way of the same antenna. Gateway terminal 14 provides communication by way of a path 9 between spacecraft cellular communications system 10 and a land-line network illustrated as a block 8. While a single gateway 14 is illustrated, the system 10 may contain many gateways at spaced-apart locations.

A network control center (NCC) 18 in FIG. 1 is a terrestrial terminal which includes an antenna 18$a$ for communication with the spacecraft, and by way of the spacecraft to the mobile user terminals 16 and the gateway(s) 14. NCC 18 also includes a GPS receiving antenna 18$g$ for receiving global positioning time signals, to provide an accurate time clock. The network control center performs the synchronization and TDMA control which the spacecraft cellular communications network requires. There may be a plurality of such NCCs throughout the system, adapted for providing control for particular sets of channels of the system. While NCC 18 is illustrated as being separate from gateway 14, those skilled in the art will recognize that the NCC includes functions, such as the antenna, which are duplicated in the gateway 14, and it makes economic sense to place the NCC(s) at the sites of the gateway(s), so as to reduce the overall system cost by taking advantage of the redundancies to eliminate expensive subsystems.

It should be understood that the normal operation of a TDMA transmitter inherently performs an interleaving function, in that a plurality of messages constituting different information are transmitted over a plurality of different "channels", each of which is represented by a non-continuous sequence of bursts, interleaved with other sequences of bursts, which carry the other information. Thus, the data of the various messages is broken into packets which are temporally interleaved onto the channel to form "virtual" channels. The function of block 234 of FIG. 2b substitutes the interrupt message in one virtual channel for the current message data which would otherwise flow in that virtual channel. In effect, the interleaved messages are then further interleaved by the TDMA system.

As so far described, the satellite communication system is generally similar to that described in a Provisional patent application filed on or about Sep. 3, 1997 in the name of Hudson, and entitled SPACECRAFT CELLULAR COMMUNICATION SYSTEM.

FIG. 2a is a simplified block diagram of a portion of the structure at a gateway terminal of the cellular communications system of FIG. 1. In FIG. 2a, a source of message signals is illustrated as a block 201. These message signals may include voice or data to be transmitted to a particular one of the mobile user terminals. The message signals are transmitted by way of a block 203 to a TDMA distributor illustrated as a block 204. Block 204 also receives messages on other channels, illustrated as 205, which messages are to be transmitted to other ones of the mobile user terminals. TDMA distributor 204 interleaves the slots of the various messages in accordance with a TDMA protocol, in known fashion, to produce one channel of data, which is transmitted, together with other such channels, to the spacecraft, for retransmission in a "bent-pipe" manner. The spacecraft then distributes the various channels to individual ones of the spot beams, depending upon the carrier frequency of the channel in question. The particular channel originating from traffic source 201 of FIG. 2a is modulated onto a selected carrier frequency, and is ultimately distributed by way of a single spot beam to all mobile user terminals lying within the footprint of that particular spot beam.

In FIG. 2a, a source of encoded call maintenance control signals is illustrated as a block 202. The encoding of the call maintenance signals is described in conjunction with FIG. 2b, below. The encoded call maintenance signals constitute, in general, a set of four slots' worth of data which is substituted for an equivalent amount of traffic data in an interleaver 203. Interleaver 203 is effectively a "single-pole, double-throw switch", which connects either traffic information source 201 or call maintenance signal source 202 to traffic N-slot block diagonal interleaver 206 and to TDMA distributor 204. During that time in which interleaver 203 connects call maintenance signal source 202 to distributor 204, the traffic signals from traffic information source 201 are not transmitted, and are lost. Traffic N-slot block diagonal interleaver 206 receives what is essentially a continuous stream of data which originates either from traffic information source 201 or call maintenance signal source 202, and interleaves bits among multiple slots, as described in more detail in the text *Mobile Radio Communications*, by Raymond Steele, published 1992 by Pentech Press, London, ISBN 0-7273-1406-8, which describes the block interleaver and the diagonal interleavers separately; the slot diagonal block interleaver referred to above is merely the concatenation of block and diagonal interleavers. The Steele book also contains a description of the GSM cellular system.

FIG. 2b is a simplified flow chart illustrating the logic for performing encoding of the call maintenance signal at either the mobile user terminal or the gateway. For definiteness, the generation at the gateway is illustrated. In FIG. 2b, the logic starts at a START block 210, and flows to a further block 212, which represents reception of a request for access to a mobile user terminal associated with the gateway in question. This request may result from a phone call from the land-line network or Public Switched Telephone System (PSTN), or from the need of a network, in the form of either the gateway or the NCC, to communicate with the mobile terrestrial user terminal on resource management issues, such as call maintenance signal on fast-associated control signal. Having received the request for access, the logic flows from block 212 to a further block 214, which represents examination of a log at the gateway which associates a particular time slot pattern with a particular mobile user terminal currently being served. The mobile user terminal for which access has been requested will either be in use, or will be idle. The logic flows to a decision block 216, which routes the logic flow, depending upon whether the mobile user terminal to be accessed is in use or not. If the mobile user terminal is not in current use, the logic leaves decision block 216, and flows to a block 218, which represents the encoding of the message onto a time slot directed to that mobile terminal, and the message is transmitted immediately. The logic then flows to a STOP block 220.

On the other hand, if the mobile user terminal is currently in use, the logic leaves decision block 216 of FIG. 2b by the YES output, and flows to a further block 222. Block 222 represents the reading of the message to be transmitted to the selected mobile user terminal which is to be accessed. Block 224 represents the "addition" to the message of at least error detection codes, and preferably error detection and correction (EDAC) codes. The message is so encoded as to guarantee reception of the signals over a channel which is relatively weak. Unfortunately, the length of the message with error detection or EDAC codes is longer than the slot interval. Consequently, the logic flows to a block 226, which represents the division of the message into four equal-content portions, each of which is smaller than a slot or burst, meaning that the data content of each of the four portions can be fitted into a single slot interval. It should be understood that the number four is appropriate for a particular embodiment of the invention described in the above-mentioned Schiavoni patent application, and may differ for other slot intervals or message lengths, or for error coding of different robustness. Block 228 represents "addition" of error correction codes to each of the four equal content portions of the message. Thus, the complete message is encoded a first time with at least error detection codes, and after division into four (or any number) of portions, the individual equal-content portions of the message are each again encoded, this time with error correction codes. Error correction codes are added to each equal-content portion of the original coded message, in an amount sufficient to fill a slot interval or slot data-carrying ability. In one mode of operation of the flow chart of FIG. 2b, the logic flows to a further block 229, which represents the interleaving of the bits of each of the equal-content error-coded portions of the message, to distribute errors throughout the slot, and also to aid in identifying a call maintenance message, as described below. Whether the bits are interleaved or not, the logic flows from block 228 to a further block 230, which represents the extraction, from the log previously used, of the slot set in which the mobile user terminal is using. Finally, the logic flows by way of a logic path 232 to a further block 234, which represents substitution of the four equal-content error-coded messages into the next four slots of traffic data allocated to the mobile user terminal in question, as described above in relation to FIG. 2a. The logic then ends at block 220.

FIG. 3 represents the logic flow in a mobile user terminal which receives a call maintenance signal during normal operation. In general, the reception of the TDMA encoded call maintenance signal requires reversing the encoding of the original signals, and it is assumed that the TDMA decoding has already been accomplished, in known fashion. In FIG. 3, the logic at the mobile user terminal begins at a START block 310, and flows to a further block 312. Block 312 represents reception of a message in a single current or present time slot, which results, in principle, in concatenation of the currently received data (the data from the current slot associated with this mobile user terminal) with the data from previous slots, to form a continuous message, which may include portions of the original traffic signals and a portion which represents the call maintenance signal, followed by further portions of traffic. From block 312, the logic flows to a block 314, which represents extraction of the data-carrying portions, at least by eliminating guard-bands, to leave bit-interleaved error-corrected signals. From block 314, the logic flows to a block 316, which represents reversal of the block diagonal interleaving originally introduced by block 206 of FIG. 2a. Such decoding is well known, and details are omitted.

From block 316 of FIG. 3, the logic flows to a block 318, which represents decoding of the concatenated message as though it were purely traffic, to produce what may be decoded traffic messages. The traffic message decoding is performed in accordance with whatever coding was used in coding the traffic message in block 201 of FIG. 2a. In practice, Viterbi decoding would ordinarily be used for decoding a convolutional code. The next block, namely logic block 320, represents the decoding of the concatenated signals as though they were purely call maintenance signals. For this purpose, the decoding follows, in a retrograde direction, the coding steps performed in blocks 228 and 229 (if used) of FIG. 2b. The corresponding decoding steps include block deinterleaving the bits to reverse the function of block 229, if appropriate, and also include the step of Viterbi decoding to regenerate the original call maintenance message, even in the presence of noise, using the convolutional error correction coding. From block 320, the logic flows to a decision block 322, in which the Viterbi decoded outputs (both traffic-decoded and call-maintenance decoded) are examined for symmetries in the decoding which indicate the presence of a valid call maintenance message. The presence of these symmetries in the decoding of a block or slot means that the slot contains call maintenance signal, and by inference indicates that the slot does not contain traffic message information. The logic leaves decision block 322 of FIG. 3 by the NO path when call maintenance signals are not present in a slot, and proceeds to a STOP block 324. The traffic message decoder signal is then presumed to be valid, and proceeds to its destination. On the other hand, if a call maintenance signal is present in a slot, the logic leaves decision block 322 by the YES output, and proceeds to a block 326, representing collection of four successive slot's worth of data into a concatenated message, corresponding to the condition of the call maintenance signal at the output of 226 of FIG. 2b. From block 326 of FIG. 3, the logic flows to a further logic block 328, representing extraction of the error detection codes which were added in block 224 of FIG. 2b. A decision block 330 of FIG. 3 represents evaluation of the remaining message to determine if it is valid, as for example by examining the error codes.

The call maintenance signal is then used for the desired function, which may be to authenticate a mobile user terminal, to command a handover, or to facilitate signalling between the mobile user terminal and the gateway during a call. Immediately after the call maintenance signals are received, the previous traffic message reception continues.

As so far described, the processing of the call maintenance signals insert such call maintenance signals into a flow of traffic signals flowing to the mobile user terminal. It might occur that the mobile user terminal would be in a transmission mode during the transmission of the call maintenance signal by the gateway terminal. In this event, the process of transmission and reception proceeds as described above, but when there is no traffic information within the slot allocation to be interrupted, and the call maintenance signals are interleaved into "empty" slots.

As so far described, the call maintenance signals have proceeded from the gateway to the mobile user terminal. For facilitation of in-call signalling, call maintenance signals may also flow from the mobile user terminals to the gateway. The encoding and decoding operations are performed in much the same manner as that described above. The only difference is that in the case of the mobile user terminal, the function performed by the TDMA interleaver 204 of FIG. 2a is, instead, the function of interleaving the mobile user terminal's own messages into the channel's slots.

Thus, a spacecraft (12) time-division multiple-access (TDMA) cellular communications system (10) as described in the Schiavoni patent application provides for communication of traffic signals, which may include audio information or data, between terminals (14, 16, 18) at disparate terrestrial locations. As is known to those skilled in the art, TDMA communication is by way of bursts or short periods of signal transmission, which are temporally interleaved with corresponding bursts from other terminals. The terrestrial locations may be user terminals (16) or gateways (14), which provide connections to the land telephone line system, or other corresponding system. The communications system includes a transmitting (12t) and receiving (12r) arrangement at the spacecraft (12), and an antenna arrangement (12a) coupled to the transmitting and receiving arrangement, for forming a plurality of spot beams (20), each of which defines a footprint (20xf) on the terrestrial surface (1). The footprints (20xf) of the spot beams may partially overlap, to provide continuous coverage of an area by multiple spot beams. The communications system (10) includes a plurality of terrestrial terminals. Some of the terrestrial terminals (14, 16, 18) may be located in the footprints (20xf) generated by the spot beams (20). Each of the terrestrial terminals (14, 16, 18) transmits electromagnetic signals to the spacecraft (12) within a predetermined frequency band, and receives electromagnetic signals from the spacecraft (12) within a second frequency band. The first and second frequency bands may be different, and in one embodiment of the Schiavoni invention the second frequency band is lower in frequency than the first. Each of the terrestrial terminals (14, 16, 18) may further include an encoder/decoder (201, 202, 203, 206, 224, 226, 228, 229, 316, 318, 320, 326, 328) for encoding at least call maintenance control signals to generate encoded control signals. The call maintenance signals are for at least temporarily interrupting the traffic signals being received at a remote location, for allowing another action to be performed. The terrestrial terminals (14, 16, 18) also transmit the encoded control signals to another one(s) of the terrestrial terminals by way of the electromagnetic signals of the spacecraft, and decode received encoded control signals. The control signals may have bit content which exceeds the bit-carrying capability of the bursts of the TDMA communications, whereby transmission of the control signals must extend over a plurality of the bursts. The encoder/decoder first adds at least error detection codes (224), and in one embodiment error detection and correction codes, to the control signals, to form error-adjusted control signals. Second, the encoder/decoder further encodes the error-adjusted control signals, by dividing the encoded error-adjusted control signals into a plurality of equal-content portions (226), and encoding each of the equal-content portions for transmission on a single burst rather than on a set of multiple bursts (228). The TDMA communications system also includes a network control system (18) coupled (by way of the spacecraft) to the terrestrial terminals, for controlling the timing of TDMA burst signals transmitted between the terrestrial terminals by way of the spacecraft, so as to tend to properly interleave the signals to prevent mutual interference. Each of the terrestrial terminals includes an inserter (203) for inserting the call maintenance signals into a burst only when a call is to be interrupted. As a result, bits are allocated to the call maintenance signals only when a call is to be interrupted, and not otherwise. This arrangement avoids the need for interrupt flag signals in each burst, which thereby makes more bits available for traffic signals, which in turn increases the traffic throughput, and the interrupt of current or present-time traffic by the call maintenance signal can be received on each individual burst rather than having to wait for completion of reception of a group of related bursts.

In a spacecraft cellular communication system as described in the abovementioned Schiavoni patent application, the gateways must perform large amounts of processing in relation to the many subscribers. It is very desirable to reduce the amount of processing performed by each of the gateways, because such a reduction in processing enhances the overall system operation. Reduction of the load on the gateways tends to provide more system capability. It was noticed that the traffic channel modules or boards performed all of the vocoder processing, and the encoding and decoding of voice signals, as well as encoding and decoding of call maintenance signals. As described in the abovementioned Schiavoni patent application, the call maintenance signals are decoded in the traffic channel modules as though voice signals, and also as though control signals, and routing decisions are made based on the results of these two decodings. Improved communications systems are desired.

SUMMARY OF THE INVENTION

A spacecraft TDMA cellular communication system provides for communicating traffic signals between disparate terrestrial locations. The communication system includes a spacecraft which includes a transmitter and a receiver. An antenna arrangement is coupled to the transmitter and receiver, for forming a plurality of spot beams, each of which defines a footprint. The footprints of the spot beams may partially overlap. The communication system also includes a plurality of terrestrial terminals, some of which may be mobile user terminals. At least some of the terrestrial terminals are coupled to receive information signals, as for example voice signals from a built-in microphone, and for encoding the information signals for transmission over the communication system. The information signals are encoded into frames of constant duration, and each frame contains a particular number of bits. The number of bits in each frame is constant, or remains the same from frame to frame. Each of the terrestrial terminals is located in at least one of the footprints. Each of the terrestrial terminals is for transmitting electromagnetic signals, including the encoded information signals, to the spacecraft within a predetermined frequency band, and for receiving electromagnetic signals within a second frequency band. Each of the terrestrial terminals further includes an encoder/decoder, for encoding control signals, to thereby generate encoded control signals including at least call maintenance control signals. The call maintenance control signals are for interrupting the traffic signals. Each of the terrestrial terminals encodes the control signals in blocks having the same duration as the duration of the frames of the information signal, and having the same particular number of bits. The decoder of each of the terrestrial terminals receives the encoded information signals and the encoded control signals, for decoding the information signals arriving from another one of the terrestrial terminals, by use of a particular decoding algorithm suited for decoding the information signals, and for decoding the control signals using the same particular decoding algorithm, whereby the terrestrial terminals need store only the particular decoding algorithm in order to decode both the information signals and the control signals.

In a particular embodiment of the invention, the decoding algorithm is a Viterbi decoding algorithm.

DESCRIPTION OF THE INVENTION

Figure 1:
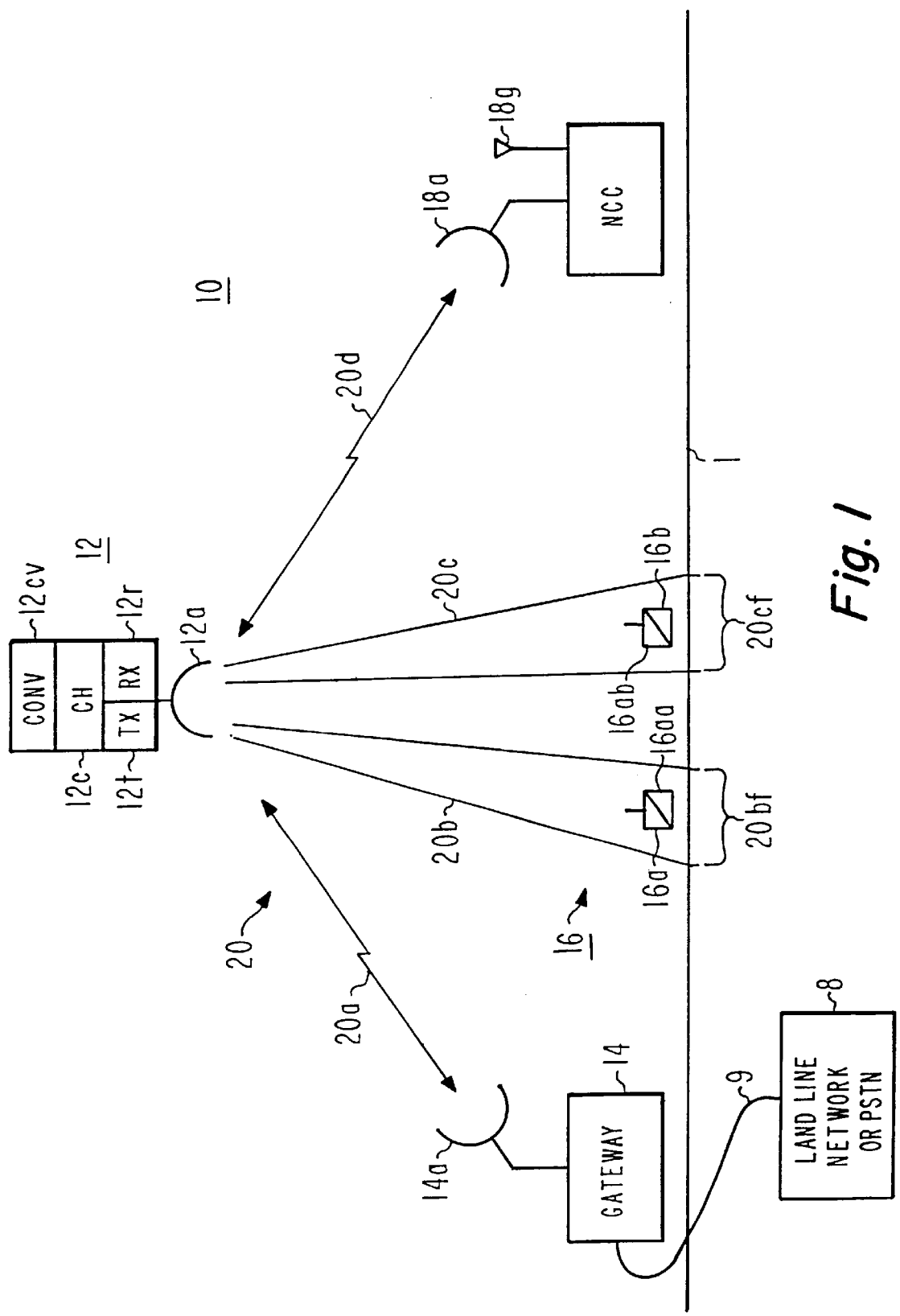
FIG. 1 is a simplified block diagram of a spacecraft or satellite cellular communications system.
Figure 2A:
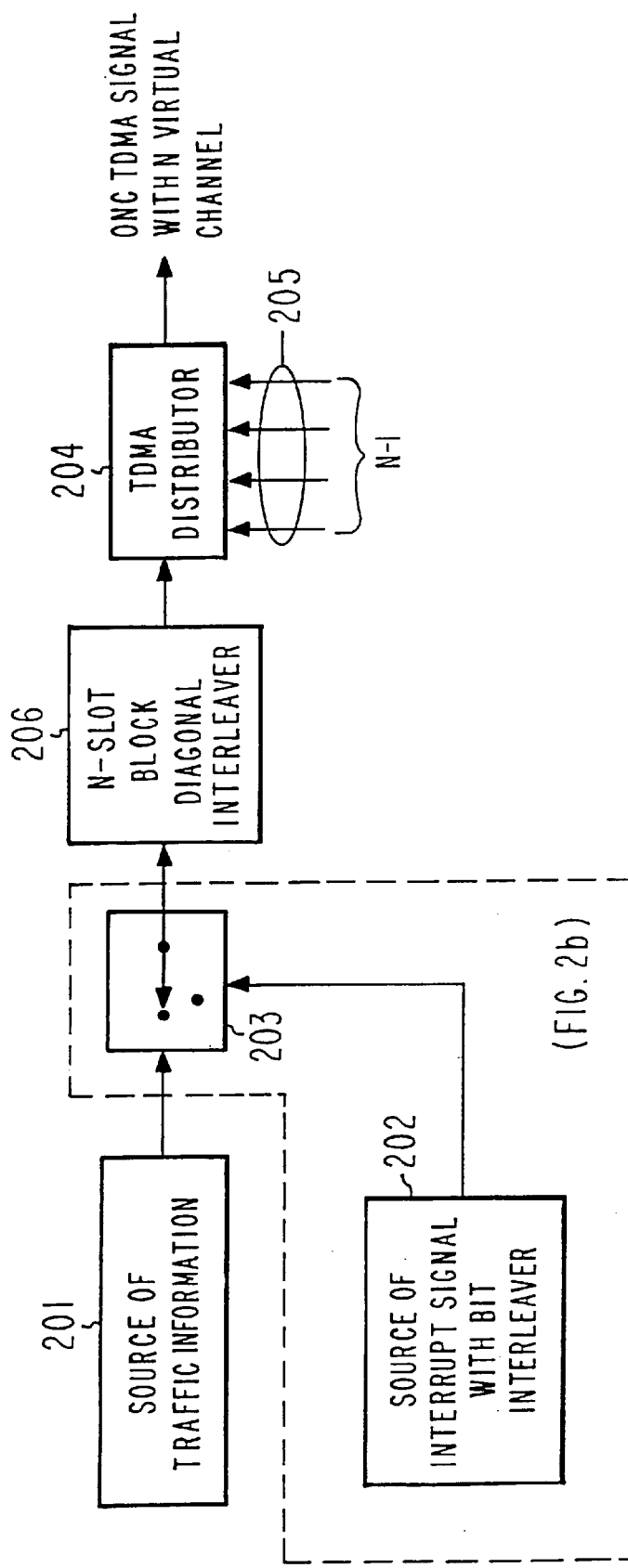
FIG. 2a is a simplified block diagram of a portion of the structure at a gateway terminal of the cellular communications system of FIG. 1.
Figure 4:
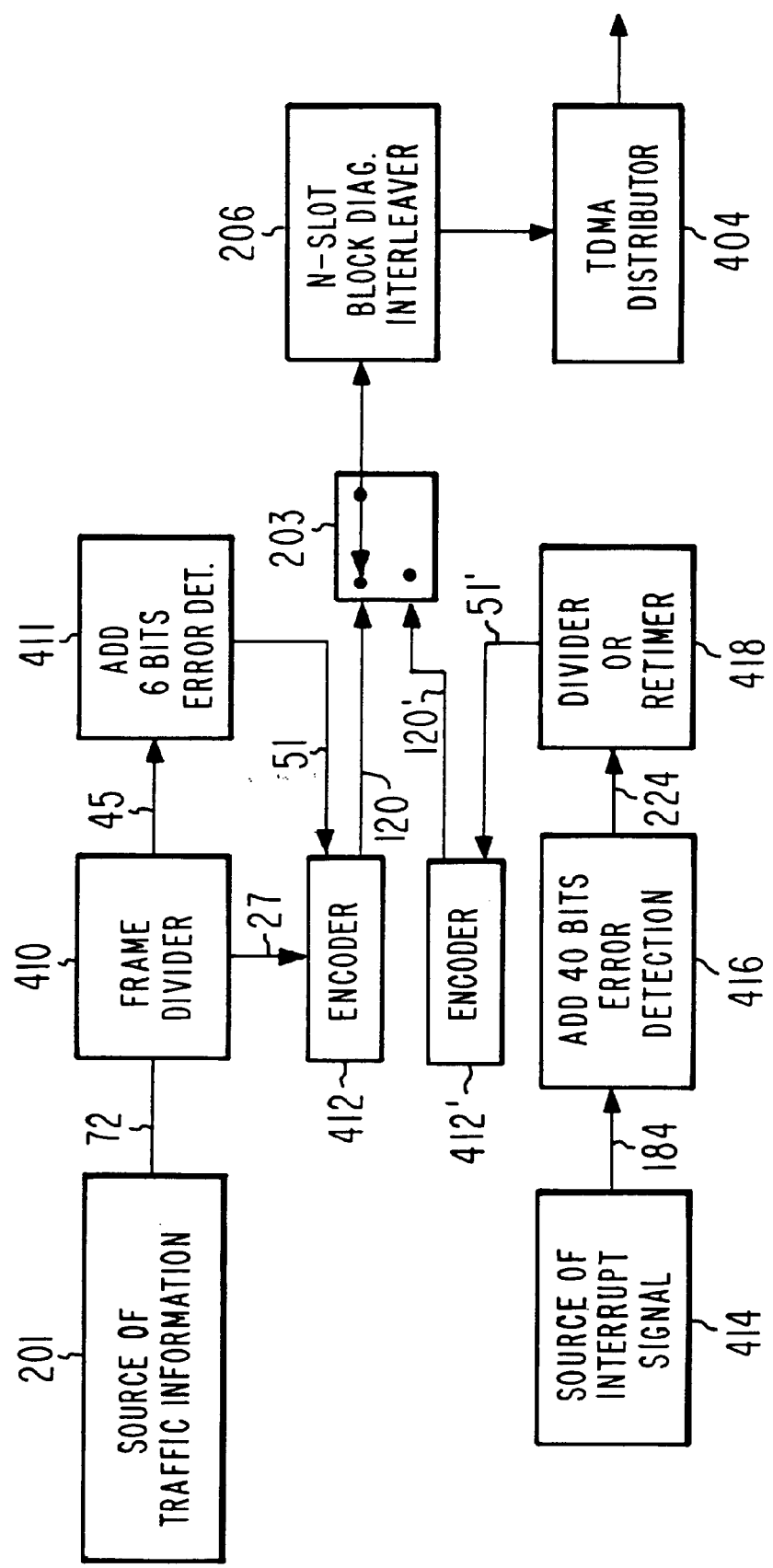
FIG. 4 is a simplified representation of a portion of a user terminal of the communication system of FIG. 1, for encoding voice and control signals in the same manner.

FIG. 4 is a simplified block diagram of a portion of the structure of a user terminal, arranged for use of the invention. Some portions of the arrangement of FIG. 4 correspond to portions of the arrangement of FIG. 2a. In other words, some portions or functions of the user terminal are identical to those of the gateway. In FIG. 4, elements corresponding exactly to those of FIG. 2a are designated by like reference numerals, and elements which are different are designated by numbers in the 400 series. In FIG. 4, the source 201 of traffic signals (the microphone, for example) produces the digitized voice or other information signals in 72-bit blocks at a given data rate. In one embodiment of the invention, the 72-bit blocks have a duration of 20 msec. The 72 bits of each block include 45 bits of "class 1" and "class 2" bits, which are relatively important in the reconstruction of the voice signals, and 27 "class 3" bits, which are less important. The 72-bit signals are applied to a block 410, which represents dividing the class 1 and class 2 bits into a 45-bit frame, and the class-3 bits into a 27-bit frame. The 27-bit frames are applied from frame divider block 410 to an encoder block 412 over a data path 27. The 45-bit frames are applied from frame divided block 410 to a block 411, which represents the addition of six error detection bits to each 45-bit frame, to thereby produce frames of 51 bits, which are applied to an encoder 412 over a data path 51.

Encoder 412 of FIG. 4 processes the 45-bit frames from data path 45 by adding six error detection bits to each frame, to thereby form 51-bit frames, and then convolutional ½ rate error correction codes are added, to produce 102-bit frames. The 102-bit frames are then summed with the 27 bits of the class-3 bits received over data path 27, to produce 129-bit frames. The portion of the 129-bit frames containing redundant information (the 102-bit portion) is punctured, as known in the art, to remove 9 bits, to leave 120-bit frames of traffic. The 120-bit frames are applied over a data path 120 to a first terminal of interleaver 203, described above in relation to FIG. 2*a*. The further processing of the signals exiting interleaver 203, is the same as that described in conjunction with FIG. 2*a*, except that TDMA distributor block 404 differs from block 204 of FIG. 2*a* in that the user terminal does not have additional data channels to send out over the system.

Figure 2B:
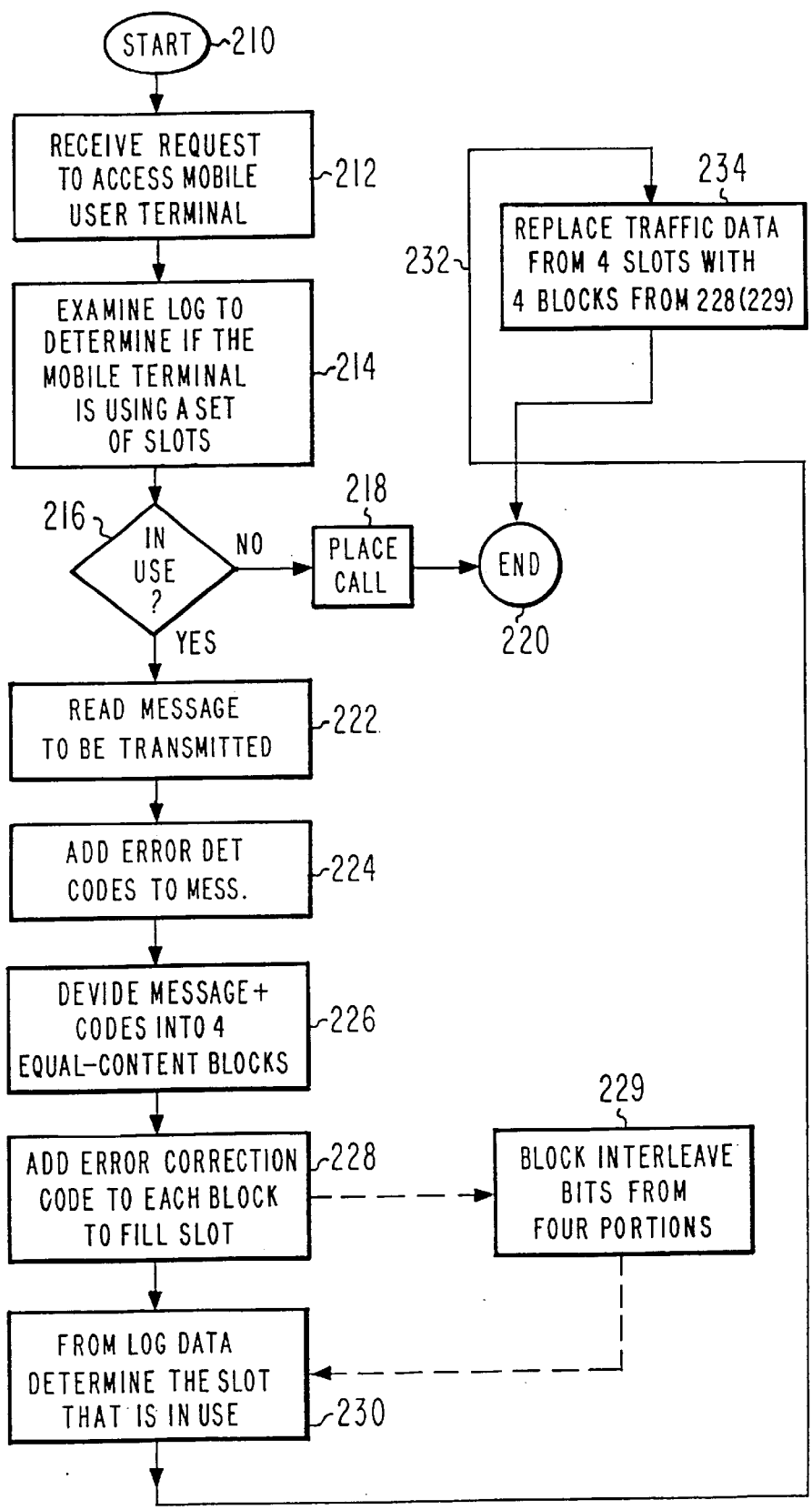
FIG. 2b is a simplified flow chart illustrating the encoding of the call maintenance signals as described in the abovementioned Schiavoni patent application.
Figure 3:
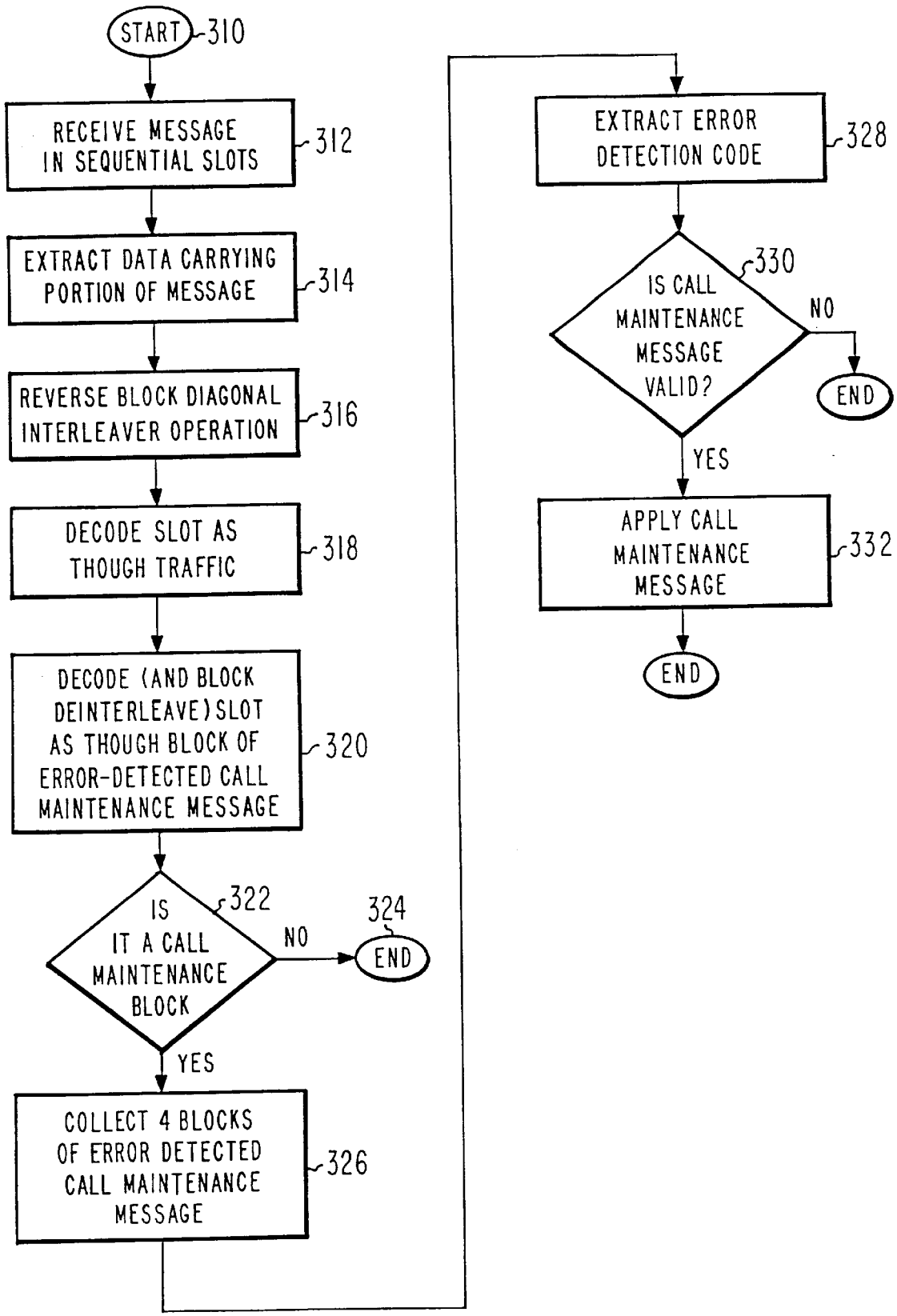
FIG. 3 is a simplified flow chart which represents the logic flow in a mobile user terminal which receives a call maintenance signal during normal operation as described in the Schiavoni application

In FIG. 4, a block 414 represents a source of interrupt control signals. Unlike the arrangement of FIG. 2*a*, the interrupt control signals of FIG. 4 are not bit interleaved. The interrupt signals occur in single 184-bit frames. The 184-bit interrupt signals are applied from block 414 over a signal path 184 to a block 416, which represents the addition of 40 bits of error detection code to the interrupt signals, to form interrupt-signal frames of 224 bits. The 224-bit frames are applied from block 416 to a further block 418, which is termed a "retimer" or "divider". Block 418 adds one dummy bit to make a 225-bit frame, and then divides the 225-bit frame into five forty-five bit frames. Six further dummy bits are then added to each forty-five bit frame, to form a sequence of five fifty-one bit frames. The sequence of fifty-one bit frames is applied over a data path 51' to an encoder illustrated as 412'. It should be noted that the interrupt-signal frame length of 51 bits corresponds to the 51-bit length of the traffic frames applied to encoder 412. Consequently, encoders 412 and 412' each have 51-bit frames at their input ports. The processing performed by encoder 412' is essentially identical to that performed by encoder 412. More particularly, the 51-bit frames at the input port of encoder 412' are encoded, with the same convolutional half-rate error correction codes as used for the traffic signals, to form 102-bit frames, and the 102-bit frames are augmented by 27 additional bits, such as a sequence of all-ones, which is unlikely to be a data signal. Thus, encoder 412' receives what amounts to 27 "dummy" bits instead of the 27 class-3 bits received by encoder 412, but both encoders add the 27 bits to 102-bit frames to produce 120-bit frames for application to a terminal of interleaver 203. Thus, the encoders 412 and 412' operate in an identical manner on identically-dimensioned frames. While the encoding is identical in the two encoders, they must run simultaneously, so there is no saving in processing in the user terminal, except possibly for the optional interleaver 229 of FIG. 2*b*. The reduction in the processing arising from use of the invention occurs at the gateway, rather than at the user terminal.

At the gateway, the message encoded as described in conjunction with FIG. 4 is received. Initially, no information is available to indicate which portions are traffic and which portions are call interrupt signals. A TDMA de-interleaver 504 at the gateway of FIG. 5 receives the various channels of TDMA-encoded information, and separates them into various paths, including the path 508. The signals on path 508 are applied to a block 510, which represents an N-frame or N-slot block diagonal de-interleaver, which reverses the interleaving performed in block 206 of FIG. 4. The output of block 510 is 120-bit frames of intermixed traffic and, when present, call maintenance signals. The 120-bit frames from deinterleaver 510 are applied to a decoder 512, which reverses the encoding performed in either of blocks 412 or 412' of FIG. 4. More particularly, nine additional unsigned or unbiased dummy bits are placed in the 120-bit frame, at those bit locations at which bits were previously removed by puncturing, to thereby form a 129-bit frame. The 129-bit frames are applied to a block 514, which is a frame divider, which breaks off the 27 class-3 bits or dummy bits, depending on what kind of information is being received. Since the kind of frame being received is not yet known, the 27 bits are applied over a data path 518 to be temporarily stored for later use in a block 524 if needed. The 102 bits are applied from block 514 over a data path 516 to a block 520, which represents a ½ rate Viterbi decoder. Since both the traffic signals (the speech) and the control signals were previously encoded using the same ½ rate convolutional coding, only a single Viterbi decoding is needed. The 51-bit frames from decoder 520 are applied over a path 521 to a block 526 and to a further block 522, which represents removal of the six error detection bits, and use of the error detection bits to evaluate each 51-bit frame. If the frame represents speech or information, there will be no error (unless due to transmission, which should have been corrected by the convolutional code). If there is no error, the frame is likely to be speech. The 51-bit frames, which are likely to be speech, are applied from block 522 to a further block 524, which represents the checking of the 27 added bits from signal path 518, to verify that they are not all-ones (or all-zeroes, as may be the case), to assure that an error in the voice frame, together with an error in parity checker 522, has not incorrectly identified the frame as voice. If the 27 bits are not all-ones (that is, that the 27 bits are not "dummy" bits), the 45-bit voice frames from error detector block 522 are gated or passed to a further path 525, for further use at the gateway of FIG. 5.

Figure 5:
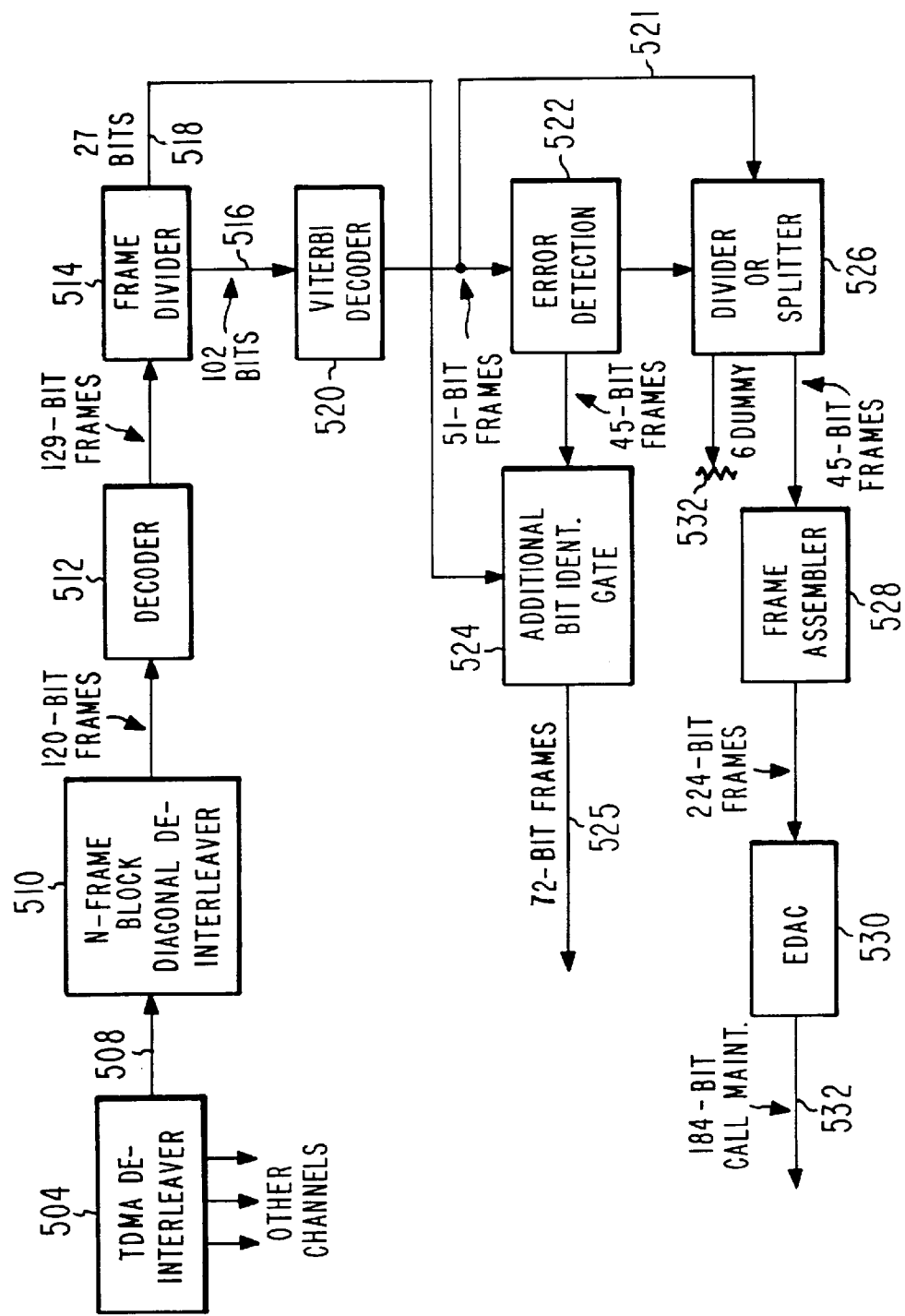
FIG. 5 is a simplified block diagram of the processing at each gateway of the system to extract the information or call maintenance signals from the sequences of frames produced by the user terminal of FIG. 4.

In FIG. 5, that portion of the Viterbi-decoded signals from block 520 which are applied over path 521 to block 526 are processed as though data. More particularly, the signals are applied from path 521 to a divider or splitter block 526, which represents the splitting off of the six dummy bits which were added in block 418 of FIG. 4. The six dummy bits are discarded, as in a "load" 532. The remaining portion of the 51-bit frames, namely the 45-bit portion, is applied from block 526 to a frame assembler block 528, which represents assembly of five 45-bit frames, minus one dummy bit, into 224-bit frames. The 224-bit frames are applied to a block 530 for error detection and correction. The 40 parity bits are used in this process, leaving the 184-bit call maintenance frames, which are available for further use on a signal path 532.

Thus, a spacecraft (12) TDMA cellular communication system (10), according to the invention, provides for communicating traffic signals between disparate terrestrial locations (14, 16). The communication system (10) includes a spacecraft (12) which includes a transmitter (12*t*) and a receiver (12*r*). An antenna arrangement (12*a*) is coupled to the transmitter (12*t*) and receiver (12*r*), for forming a plurality of spot beams (at least 20*b*, 20*c*), each of which defines a footprint (20*bf*, 20*cf*). The footprints (20*bf*, 20*cdf*)

of the spot beams (20b, 20c) may partially overlap. The communication system (10) also includes a plurality of terrestrial terminals (14, 16a, 16b), some of which may be mobile user terminals. At least some of the terrestrial terminals (14, 16a, 16b) are coupled to receive information signals, as for example voice signals from a built-in microphone in the case of a mobile user terminal (16a, 16b), and telephone signals from a PSTN in the case of a gateway (14), and for encoding the information signals for transmission over the communication system (10). The information signals are encoded into frames of constant duration (20 msec), and each frame contains a particular number of bits (51 bits). The number of bits in each frame is constant, or remains the same from frame to frame. Each of the terrestrial terminals (14, 16a, 16b) is located in at least one of the footprints (20bf, 20cf). Each of the terrestrial terminals (14, 16a, 16b) is for transmitting electromagnetic signals, including the encoded information signals, to the spacecraft (12) within a predetermined frequency band (uplink frequency), and for receiving electromagnetic signals within a second frequency band (downlink frequency). Each of the terrestrial terminals (14, 16a, 16b) further includes an encoder/decoder (412'), for encoding control signals, to thereby generate encoded control signals including at least call maintenance control signals. The call maintenance control signals are for interrupting the traffic signals. Each of the terrestrial terminals encodes the control signals in blocks having the same duration (20 msec) as the duration of the frames of the information signal, and having the same particular number of bits (120). The decoder (512, 514, 516) of each of the terrestrial terminals (14, 16a, 16b) receives the encoded information signals and the encoded control signals, for decoding the information signals arriving from another one of the terrestrial terminals, by use of a particular decoding algorithm suited for decoding the information signals, and for decoding the control signals using the same particular decoding algorithm, whereby the terrestrial terminals need store only the particular decoding algorithm in order to decode both the information signals and the control signals. In a particular embodiment of the invention, the decoding algorithm is a Viterbi decoding algorithm.

Other embodiments of the invention will be apparent to those skilled in the art. For example, while the described communication system relies on spot beams for communication, the satellite may also produce one or a few broad beams which can be used for communication with fixed terrestrial terminals, such as gateways, which are fitted with high-gain antennas.

What is claimed is:

1. A spacecraft TDMA cellular communication system, for communicating traffic signals between disparate terrestrial locations, said system comprising:

a spacecraft including transmitting and receiving means, and an antenna arrangement coupled to said transmitting and receiving means, for forming a plurality of spot beams, each of which defines a footprint, which footprints of said spot beams may partially overlap;

a plurality of terrestrial terminals, some of which may be mobile user terminals, at least some of which are coupled to receive information signals, and for encoding said information signals for transmission over said communication system, said information signals being encoded into frames of constant duration, each frame of which contains a particular number of bits, which number of bits remains the same from frame to frame, each of said terrestrial terminals being located in at least one of said footprints, each of said terrestrial terminals being for transmitting electromagnetic signals including said encoded information signals to said spacecraft within a predetermined frequency band, and for receiving electromagnetic signals within a second frequency band, each of said terrestrial terminals further including encoding/decoding means, for encoding control signals to generate encoded control signals including at least call maintenance control signals, which call maintenance control signals are for interrupting said traffic signals, each of said terrestrial terminals encoding said control signals in blocks having the same duration as said duration of said frames of said information signal, and having said particular number of bits;

each of said terrestrial terminals also including receiving/decoding means for receiving said encoded information signals and said encoded control signals, for decoding said information signals arriving from another one of said terrestrial terminals by use of a particular decoding algorithm suited for decoding said information signals, and for decoding said control signals using said particular decoding algorithm, whereby said terrestrial terminals need store only said particular decoding algorithm in order to decode both said information signals and said control signals.

2. A communication system according to claim 1, wherein said decoding algorithm is a Viterbi decoding algorithm.

3. A TDMA cellular communication system, for communicating traffic signals between disparate terrestrial locations by way of a spacecraft which includes transmitting and receiving means, and also includes an antenna arrangement coupled to said transmitting and receiving means for forming a plurality of spot beams, each of which defines a terrestrial footprint, said system comprising:

a plurality of terrestrial terminals, some of which may be mobile user terminals, at least some of which are coupled to receive information signals, and for encoding said information signals for transmission over said communication system, said information signals being encoded into frames of constant duration, each frame of which contains a particular number of bits, which number of bits remains the same from frame to frame, each of said terrestrial terminals being located in at least one of said footprints, each of said terrestrial terminals being for transmitting electromagnetic signals including said encoded information signals to said spacecraft within a predetermined frequency band, and for receiving electromagnetic signals within a second frequency band, each of said terrestrial terminals further including encoding/decoding means, for encoding control signals to generate encoded control signals including at least call maintenance control signals, which call maintenance control signals are for interrupting said traffic signals, each of said terrestrial terminals encoding said control signals in blocks having the same duration as said duration of said frames of said information signal, and having said particular number of bits;

each of said terrestrial terminals also including receiving/decoding means for receiving said encoded information signals and said encoded control signals, for decoding said information signals arriving from another one of said terrestrial terminals, by use of a particular decoding algorithm suited for decoding said information signals, and for decoding said control signals using said particular decoding algorithm, whereby said terrestrial terminals need store only said particular decoding algorithm in order to decode both said information signals and said control signals.

4. A communication system according to claim 3, wherein said decoding algorithm is a Viterbi decoding algorithm.

5. A terrestrial user terminal for communication of traffic signals between disparate terrestrial locations in a spacecraft cellular communication system in which the spacecraft includes transmitting and receiving means, and also includes an antenna arrangement coupled to said transmitting and receiving means for forming a plurality of spot beams, each of which spot beams defines a footprint, which footprints of said spot beams may partially overlap, said user terminal, when in use, lying in at least one of said footprints, and comprising:

means for receiving information signals for transmission over said communication system, and for encoding said information signals into frames of equal duration, each of said frames containing a particular number of bits, which number of bits remains the same from frame to frame, for thereby generating encoded information signals;

means for transmitting electromagnetic signals to said spacecraft within a predetermined frequency band, said electromagnetic signals including said encoded information signals, and for, within a second frequency band, receiving electromagnetic signals from said spacecraft, which received electromagnetic signals include encoded information signals;

encoding and transmitting means, for encoding control signals into blocks having the same duration as said duration of said frames of said information signal, and having said particular number of bits, to thereby generate and transmit encoded control signals, said encoded control signals including at least call maintenance control signals, which call maintenance control signals are for interrupting said traffic signals;

receiving decoding means for receiving said encoded information signals and said encoded control signals, for decoding said information signals arriving from another one of said user terminals by use of a particular decoding algorithm suited for decoding said information signals, and for decoding said control signals using said particular decoding algorithm, whereby said user terminals need store only said particular decoding algorithm in order to decode both said information signals and said control signals.

6. A user terminal according to claim 5, wherein said traffic signals are TDMA coded.

7. A communication system according to claim 5, wherein said decoding algorithm is a Viterbi decoding algorithm.

* * * * *